United States Patent
Xu et al.

(10) Patent No.: US 12,292,324 B2
(45) Date of Patent: May 6, 2025

(54) WEIGHT STABILITY CONTROL METHOD FOR DEADWEIGHT FORCE STANDARD MACHINE

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Hanqing Xu, Changzhou (CN); Leiyue Zhang, Changzhou (CN)

(73) Assignees: Mettler-Toledo (Changzhou) Measurement Technology Ltd., Changzhou (CN); Mettler-Toledo (Changzhon) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 138 days.

(21) Appl. No.: 18/278,511

(22) PCT Filed: Mar. 7, 2022

(86) PCT No.: PCT/CN2022/079514
§ 371 (c)(1),
(2) Date: Aug. 23, 2023

(87) PCT Pub. No.: WO2022/188738
PCT Pub. Date: Sep. 15, 2022

(65) Prior Publication Data
US 2024/0053189 A1    Feb. 15, 2024

(30) Foreign Application Priority Data
Mar. 8, 2021 (CN) .......................... 202110250652.0

(51) Int. Cl.
*G01G 23/01* (2006.01)
(52) U.S. Cl.
CPC .................................... *G01G 23/01* (2013.01)
(58) Field of Classification Search
CPC ................................ G01G 23/01; A01L 25/00
See application file for complete search history.

(56) References Cited

U.S. PATENT DOCUMENTS 3,272,014 A * 9/1966 Miks .......................... G01L 7/16
    73/1.65
4,648,595 A * 3/1987 Selle ....................... A63B 21/078
    482/104

(Continued)

FOREIGN PATENT DOCUMENTS

DE       3909914 C1    2/1990
DE       4112839 C1    3/1992

*Primary Examiner* — Garrett K Atkinson
(74) *Attorney, Agent, or Firm* — Standley Law Group LLP; Jeffrey S. Standley; Adam J. Smith

(57) ABSTRACT

These disclosures provide a weight stability control method for a deadweight force standard machine. For each weight in a sequence until all weights are loaded: weight platform is relatively rapidly moved downwards from an initial position, lifting a first-stage weight by a weight disk, and starting to load the first-stage weight starts; the first-stage weight is displaced relatively slowly when the first-stage weight communicates with a second-stage weight via corresponding lifting components for the first time; after the first-stage weight is completely separated from the second-stage weight, relatively rapidly displacing the weight platform downwards again until a gap between the first-stage weight and the second-stage weight reaches half of a pre-set gap value. The method provides control over the stability of the weights, effectively solving the weight shaking problem and improving testing efficiency.

8 Claims, 3 Drawing Sheets

(56) References Cited

U.S. PATENT DOCUMENTS

| | | | |
|---|---|---|---|
| 6,840,731 B2* | 1/2005 | Figiel | B66C 1/485 |
| | | | 414/619 |
| 2016/0206913 A1* | 7/2016 | Haggard | A63B 21/078 |
| 2020/0166426 A1* | 5/2020 | Childers | G01L 3/20 |
| 2021/0331023 A1* | 10/2021 | Farrow | A63B 23/02 |
| 2022/0283018 A1* | 9/2022 | Rahimi | G01G 21/26 |

* cited by examiner

WEIGHT STABILITY CONTROL METHOD FOR DEADWEIGHT FORCE STANDARD MACHINE

TECHNICAL FIELD

The present invention relates to the field of deadweight force standard machines, and in particular to a weight stability control method for a deadweight force standard machine.

BACKGROUND ART

FIG. 1 is a schematic structural diagram of a known deadweight force standard machine. As shown in FIG. 1, the deadweight force standard machine is a machine that takes the gravity of weights as standard loads, and automatically and smoothly apply the loads to a tested sensor directly in a pre-set sequence through an appropriate mechanism.

The deadweight force standard machine comprises a weight platform 10, a plurality of weights 20, a deadweight force standard machine frame 30, a deadweight force standard machine reverse frame 40 and a sensor 50, wherein the weights 20 are placed on the weight platform 10 after being connected sequentially via one or more eye bolts 21. The deadweight force standard machine reverse frame 40 is installed on the deadweight force standard machine frame 30. The sensor 50 is arranged on the deadweight force standard machine frame 30 and is in contact with the deadweight force standard machine reverse frame 40. The weights 20 are connected to the deadweight force standard machine reverse frame 40 via a weight disk 60, and the weights 20 are loaded on the deadweight force standard machine frame 30 by means of the deadweight force standard machine reverse frame 40.

The known deadweight force standard machine has the following disadvantages:
1. Machined surfaces of the weights are not absolutely horizontal; so the loading speed needs to be low, otherwise the weights would be unsteady.
2. Center of mass of the weights is not necessarily the geometric center of the weights; so the loading speed needs to be low, otherwise the weights become unstable.
3. Intervals between the weights are not absolutely equal. For example, there is a separation angle that leads to premature separation, so the loading speed needs to be low, otherwise the weights become shaky.
4. The weight platform is not always absolutely horizontal, thus causing the weights to tilt after being stacked.

The weights move downwards, the upper loaded weight is lifted up and loaded on the sensor. In an optimized control method, the weights move at the same speed, and the above problems are caused because the deadweight force standard machine and the weights themselves are unstable.

In view of these shortcomings, the applicant's inventors have devised a new weight stability control method for a deadweight force standard machine.

SUMMARY

The technical problem to be solved by the present invention is the shaking of weights when the weights are moved at the same speed in the prior art deadweight force standard machine.

The present invention solves the above technical problem through a weight stability control method for a deadweight force standard machine. The deadweight force standard machine comprising one or more weights connected sequentially from top to bottom, and stacked on a weight platform; the uppermost, first-stage weight being connected to a weight disk via one or more lifting components, one or more lifting components being installed in between every two adjacent weights. The weight stability control method comprising the following steps: S1, performing a no-load stroke in which the moving weight is not in contact with the relatively static weight, the weight platform rapidly moves downwards from an initial position, the weight disk lifts the first-stage weight, and the first-stage weight starts to be loaded; S2, performing a loaded stroke in which the moving weight is in contact with the relatively static weight, and when the first-stage weight interacts with the weight disk via the corresponding lifting components for the first time, the weight platform starts to be slowly displaced downwards; S3, after the first-stage weight is completely separated from the weight disk, rapidly displacing the weight platform downwards again until a gap between the first-stage weight and the weight disk reaches half of a pre-set gap value; and S4, repeating steps S1-S3 in the loading process of the first-stage weight for the second-stage weight all through to the nth-stage weight in sequence until all the weights are loaded.

According to one embodiment of the present invention, the lifting components are eye bolts, the weight disk and the weights are each provided with one or more lifting holes, the eye bolts are installed in the corresponding lifting holes and are connected to the corresponding weights below the eye bolts.

According to one embodiment of the present invention, the lifting holes are conical through holes. Each of the lifting holes comprises an upper end opening and a lower end opening. The upper end opening is larger than the lower end opening of each lifting hole, and the eye bolts are arranged in the lifting holes in a penetrating manner.

According to one embodiment of the present invention, each eye bolt comprises an eye bolt head and a lifting rod, the eye bolt head is arranged at one end of the lifting rod, and the other end of the lifting rod is connected to the weight immediately below the lifting rod, and the width of the eye bolt head is larger than that of the lower end opening of the corresponding lifting hole.

According to one embodiment of the present invention, a displacement detector, an infrared detector, a laser detector or a draw-wire sensor is installed on the weight platform and configured to detect coordinates of the weight platform and displacements of the weights.

According to one embodiment of the present invention, the speed of the rapid displacement in steps S1 and S3 is 2 mm/s.

According to one embodiment of the present invention, the speed of the slow displacement in step S2 is 0.5 mm/s.

According to one embodiment of the present invention, in step S2, a force of friction generated between the first-stage weight and the second-stage weight due to swinging forms the damping of the swinging of the first-stage weight.

The positive and progressive effects of the present invention are as follows: the weight stability control method for a deadweight force standard machine of the present invention enables the manual collection and calculation of internal parameters such as the displacements and the number of weights. The method aids in determining the boundaries between rapid displacement and slow displacement. The method also helps in determining the magnitude of rapid displacement by means of peripheral infrared, laser and draw-wire sensors, thereby achieving control over the stability of weights. The problem associated with the shaking of weights is effectively solved, thereby improving the testing efficiency.

BRIEF DESCRIPTION OF THE DRAWINGS

The aforementioned features, properties and advantages of the present invention will become clearer based on the description below in conjunction with the accompanying drawings and embodiments, and the same features are denoted by the same reference numerals throughout the figures, in which.

DETAILED DESCRIPTION OF EMBODIMENTS

Figure 1:
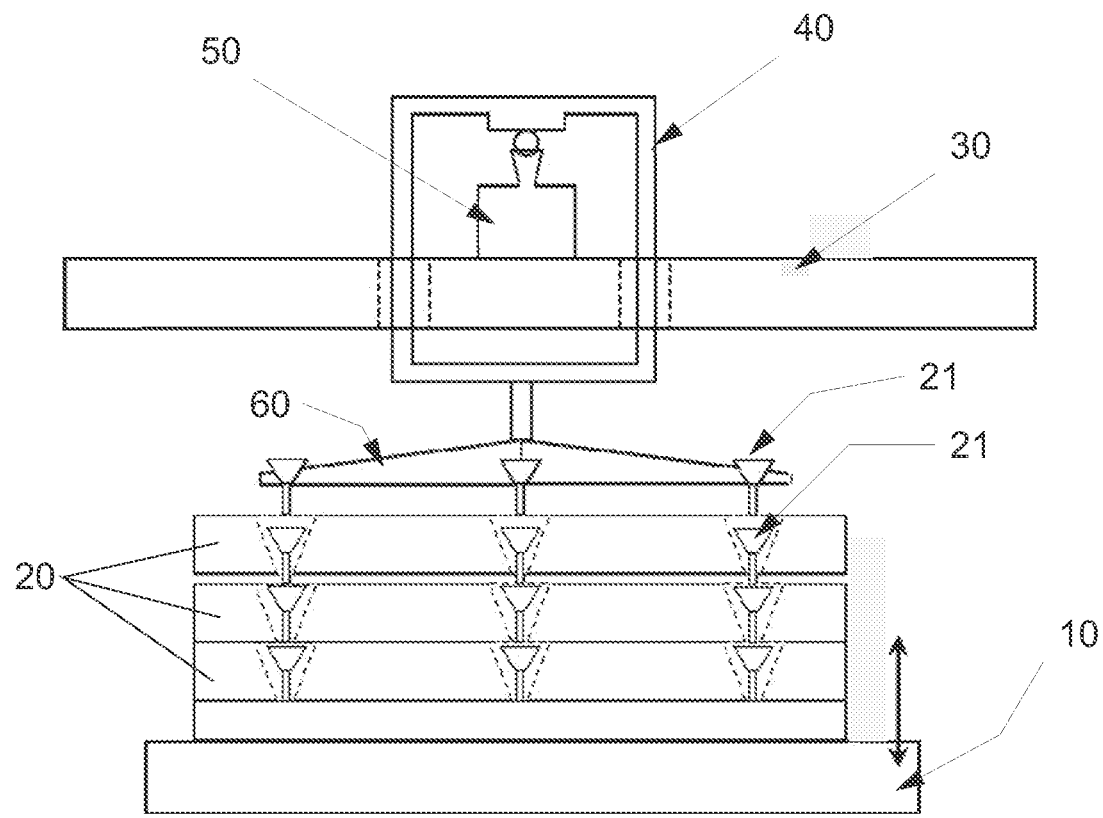
FIG. 1 is a schematic structural diagram of a known deadweight force standard machine.

To make the above objects, features and advantages of the present invention more apparent and easier to understand, specific implementations of the present invention are described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Figure 2:
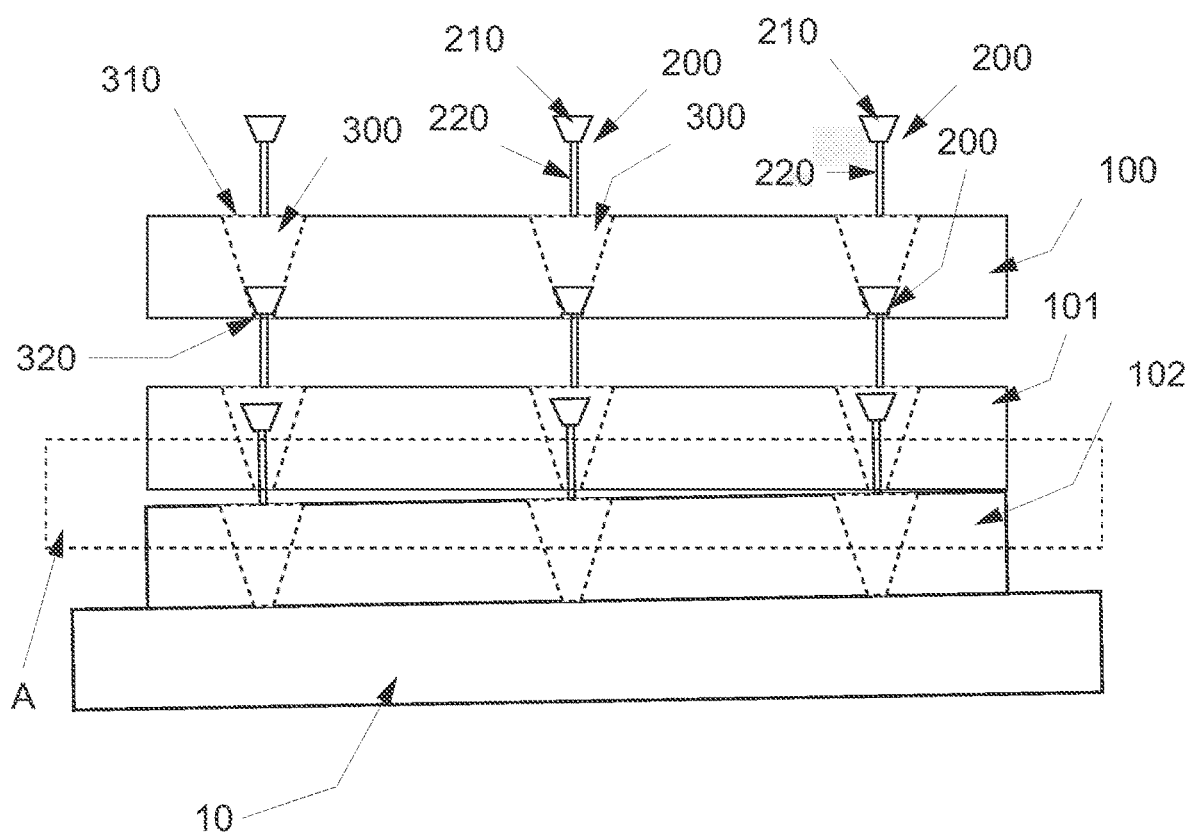
FIG. 2 is a schematic diagram of a weight stability control method for a deadweight force standard machine of the present invention.

FIG. 2 is a schematic diagram of a weight stability control method for a deadweight force standard machine of the present invention.

As shown in FIG. 2, the present invention discloses a weight stability control method for a deadweight force standard machine comprising one or more weights connected sequentially from top to bottom. The weights are stacked on a weight platform 10, the uppermost, first-stage weight 100 is connected to a weight disk 60 via one or more lifting components 200, and one or more lifting components 200 are installed in between every two adjacent weights. The weight stability control method comprises the steps S1 to S4.

Firstly, according to Step S1, a no-load stroke is performed, and the weight platform 10 starts to be rapidly displaced downwards from the initial position until the first-stage weight 100 is lifted up by the weight disk 60 via the corresponding lifting components 200. Then the first-stage weight 100 starts to be loaded.

At S2, a loaded stroke is performed when the first-stage weight 100 is in contact communication with the weight disk 60 via the corresponding lifting components 200, then the weight platform 10 starts to be slowly displaced downwards. At the same time, the second-stage weight 101 is moving downwards as it is still on the weight platform 10. The slow displacement is used for separation of the first-stage weight 100 and the second-stage weight 101, such the shaking of the weights can be effectively reduced. For example, contact and separation of the weights may also be indicated by an I/O signal or by using fixed displacement coordinates. In the slow process, the force of friction caused by swinging can act as the damping of the swinging of the weights, and the swinging amplitude of the weights in the loading and unloading processes is reduced.

At S3, when the first-stage weight 100 is lifted up and separated from the second-stage weight 101, the weight platform 10 is rapidly displaced downwards again until a gap between the first-stage weight 100 and the second-stage weight 101 reaches half of a pre-set gap value.

At S4, steps S1-S3 in the loading process of the first-stage weight 100 are repeated for the second-stage weight 101.

Similarly, after loading the first-stage weight 100 is finished, the second-stage weight 101 starts to be loaded. At S1, the first-stage weight 100 is relatively static as it is lifted up, the second-stage weight 101 will be moving downwards, the second-stage weight 101 is not in contact with the first-stage weight 100, then the weight platform 10 starts to be rapidly displaced downwards. At S2, when the second-stage weight 101 interacts with the first-stage weight 100 via the corresponding lifting components 200 for the first time, the second-stage weight 102 starts to be loaded and the weight platform 10 starts to be slowly displaced downwards again. At S3, after it is determined that the second-stage weight 101 is completely separated from the third-stage weight 102, the weight platform 10 starts to be rapidly displaced downwards again until the gap between the second-stage weight 101 and the third-stage weight 102 reaches a pre-set value.

Similarly, the above steps are repeated in sequence through to the next-stage weight to the nth-stage weight until all the weights are loaded.

Herein, the speed of the rapid displacement in steps S1 and S3 is 2 mm/s. The speed of the slow displacement in step S2 is preferably 0.5 mm/s.

Preferably, in the above embodiment, the lifting components 200 are eye bolts. The weight disk 60 and the weights (100, 101, 102) are each provided with a plurality of lifting holes 300, and the eye bolts are installed in the corresponding lifting holes 300 and are connected to the corresponding weights below the eye bolts. The lifting holes 300 are preferably conical through holes. An upper end opening 310 is larger than a lower end opening 320 of each lifting hole 300. The eye bolts are arranged in the lifting holes 300 in a penetrating manner.

Further, each eye bolt comprises an eye bolt head 210 and a lifting rod 220, the eye bolt head 210 is arranged at one end of the lifting rod 220, the other end of the lifting rod 220 is connected to the weight immediately below the lifting rod. The width of the eye bolt head 210 is larger than that of the lower end opening of the corresponding lifting hole 300.

Further, a displacement detector, an infrared detector, a laser detector or a draw-wire sensor is installed on the weight platform 10 and configured to detect coordinates of the weight platform 10 and displacements of the weights, that is, to determine the boundaries between rapid displacements and slow displacement. The displacements correspond to the number of the weights on a one-to-one basis, and the infrared and laser detectors need the provision of additional components for detection. In addition, the deadweight force standard machine reads data of a tested sensor after all the weights are loaded or after each S3 to monitor the loading process.

Herein, the weights (100, 101, 102) are isolated from the weight platform 10 by an insulating material so as to avoid conducting between the weights (100, 101, 102) and the weight platform 10. Friction abutment detection devices, such as voltage and current on-off detection devices for detecting the weights, are installed on the machine frame and the weight platform 10 of the deadweight force standard machine, and used for detecting contact (conducting) and separation (de-conducting) between the weights (100, 101, 102).

By means of the friction abutment detection devices (conducting and de-conducting) between the deadweight force standard machine frame 30 and the weights (100, 101, 102) and based on the displacement detector, the infrared detector, the laser detector or the draw-wire sensor, relative coordinates (namely the boundaries between the rapid displacements and the slow displacement) of the weight platform 10 are determined.

Figure 3:
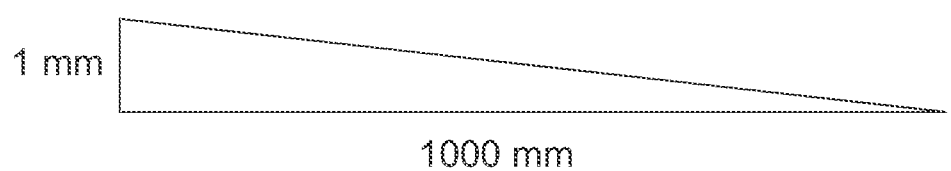
FIG. 3 is a magnified view of a gap in part A of FIG. 2.

FIG. 3 is a magnified view of a gap in part A in FIG. 2. Under ideal conditions, the adjacent weights can be separated instantly because of being absolutely horizontal. In practice, however, a force standard machine system is not absolutely horizontal due to technical reasons such as machining or assembly.

FIG. 3 demonstrates a scenario where the diameter of each weight (100, 101, 102) is 1000 mm and the side normal to the diameter is 1 mm. Where the freely-hung weights are disposed absolutely horizontal due to gravity, the slope of the weight platform (10) is $1/1000$, and the moving speed of the weights is 0.5 mm/s, the weights (100, 101, 102) would be completely separated within 2 s.

In conclusion, the weight stability control method for the deadweight force standard machine of the present invention can utilize internal parameters such as the displacements and the number of weights, or peripheral infrared, laser and draw-wire sensors to find boundaries between rapid displacement, slow displacement and rapid displacement, such that control over the stability of the weights is achieved, the problem of shaky weights is effectively resolved, and the testing efficiency is improved.

Although the specific implementations of the present invention are described above, a person skilled in the art should understand that these are only exemplary, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST weight platform 10
weight 20
deadweight force standard machine frame 30
deadweight force standard machine reverse frame 40
sensor 50
weight disk 60
eye bolt 21
first-stage weight 100
second-stage weight 101
third-stage weight 102
lifting component 200
lifting hole 300
upper end opening of lifting hole 310
lower end opening of lifting hole 320
eye bolt head 210
lifting rod 220

The invention claimed is:

1. A weight stability control method for a deadweight force standard machine comprising a plurality of weight stages connected sequentially from top to bottom and stacked on a weight platform, a first-stage weight of the plurality of weight stages connected to a weight disk via one or more lifting components that are installed in between every two adjacent weight stages of the plurality of weight stages, wherein the weight stability control method comprises the following steps:
   S1, performing a no-load stroke in which a weight which is moving is not in contact with a weight which is static, the weight platform rapidly moves downwards from an initial position, the weight disk lifts the first-stage weight, and the first-stage weight starts to be loaded;
   S2, performing a loaded stroke in which the weight which is moving is in contact with the weight which is static, and when the first-stage weight interacts with the weight disk via the corresponding lifting components for the first time, the weight platform starts to be relatively slowly displaced downwards;
   S3, after the first-stage weight is completely separated from the weight disk, relatively rapidly displacing the weight platform downwards again until a gap between the first-stage weight and the weight disk reaches half of a pre-set gap value; and
   S4, repeating steps S1-S3 in the loading process of the first-stage weight for a second-stage weight all through to an nth-stage weight in sequence until all the one or more weights are loaded.

2. The method of claim 1, wherein:
the lifting components comprise eye bolts;
the weight disk and the plurality of weight stages are each provided with one or more lifting holes;
the eye bolts are installed in the corresponding lifting holes and are connected to the corresponding weight stage below the eye bolts.

3. The method of claim 2, wherein:
the lifting holes comprise conical through holes;
each of the lifting holes comprising an upper end opening and a lower end opening;
the upper end opening is larger than the lower end opening; and
the eye bolts are arranged in the lifting holes in a penetrating manner.

4. The method of claim 3, wherein:
each of the eye bolts comprises an eye bolt head and a lifting rod;
the eye bolt head is arranged at one end of the lifting rod and an opposing end of the lifting rod is connected to a respective one of the weight stage immediately below the lifting rod; and
a width of the eye bolt head is larger than a width of the lower end opening of the corresponding lifting hole.

5. The method of claim 1, wherein a displacement detector, an infrared detector, a laser detector or a draw-wire sensor is installed on the weight platform and is configured to detect coordinates of the weight platform and displacements of the weight stage.

6. The method of claim 1, wherein a speed of the relatively rapid displacement in steps S1 and S3 is 2 mm/s.

7. The method of claim 1, wherein a speed of the relatively slow displacement in step S2 is 0.5 mm/s.

8. The method of claim 1, wherein in step S2, a force of friction generated between the first-stage weight and the second-stage weight due to swinging dampens the swinging of the first-stage weight.

* * * * *

UNITED STATES PATENT AND TRADEMARK OFFICE
CERTIFICATE OF CORRECTION

PATENT NO. : 12,292,324 B2  
APPLICATION NO. : 18/278511  
DATED : May 6, 2025  
INVENTOR(S) : Hanqing Xu et al.

Page 1 of 1

It is certified that error appears in the above-identified patent and that said Letters Patent is hereby corrected as shown below:

On the Title Page

Item [57], Line 3, please delete "loaded: weight" and insert -- loaded: a weight --.

In the Claims

In Column 6, Line 55, Claim 4, delete "stage" and insert -- stages --.

In Column 6, Line 63, Claim 5, delete "stage" and insert -- stages --.

Signed and Sealed this  
Twenty-fourth Day of June, 2025

Coke Morgan Stewart  
*Acting Director of the United States Patent and Trademark Office*